(12) United States Patent
Gorday et al.

(10) Patent No.: US 10,277,390 B1
(45) Date of Patent: Apr. 30, 2019

(54) REDUCED-POWER DETECTION OF WIRELESS PACKETS USING DECIMATED PREAMBLE CORRELATION

(71) Applicant: Arm Limited, Cambridge (GB)

(72) Inventors: Paul Edward Gorday, West Palm Beach, FL (US); Ricardo Franco, Plantation, FL (US)

(73) Assignee: Arm Limited, Cambridge (GB)

( * ) Notice: Subject to any disclaimer, the term of this patent is extended or adjusted under 35 U.S.C. 154(b) by 0 days.

(21) Appl. No.: 15/876,421

(22) Filed: Jan. 22, 2018

(51) Int. Cl.
| | |
|---|---|
| *H04L 7/04* | (2006.01) |
| *H04L 27/10* | (2006.01) |
| *H04L 27/16* | (2006.01) |
| *H04L 27/227* | (2006.01) |
| *H04L 27/00* | (2006.01) |

(52) U.S. Cl.
CPC .......... *H04L 7/042* (2013.01); *H04L 27/106* (2013.01); *H04L 27/16* (2013.01); *H04L 27/2278* (2013.01); *H04L 2027/0095* (2013.01)

(58) Field of Classification Search
CPC ...................................... H04L 7/042
USPC ........................................ 375/343
See application file for complete search history.

(56) References Cited

U.S. PATENT DOCUMENTS

| | | | | |
|---|---|---|---|---|
| 6,553,059 B1* | 4/2003 | Ito | ............ | H04B 1/707 375/150 |
| 2009/0213006 A1* | 8/2009 | Nayyar | ............ | G01S 19/36 342/357.36 |
| 2012/0272110 A1* | 10/2012 | Rajski | ............ | G01R 31/31721 714/726 |

OTHER PUBLICATIONS

R. Ghanaatian, P. N. Whatmough, J. Constantin, A. Teman and A. Burg, "A Low-Power Correlator for Wakeup Receivers with Algorithm Pruning Through Early Termination," 2016 IEEE International Symposium on Circuits and Systems (ISCAS), Montreal, QC, 2016, pp. 2667-2670. doi: 10.1109/ISCAS.2016.7539142.

* cited by examiner

*Primary Examiner* — Lihong Yu
(74) *Attorney, Agent, or Firm* — Leveque IP Law, P.C.

(57) ABSTRACT

A method, apparatus and computer program product for performing decimated correlation in a wireless communications network is disclosed. An input signal composed of a plurality of streaming samples of the input signal is received and applied to a plurality of shift registers coupled to computation logic. The computation logic receives an input of correlation options and a correlation pattern. Based upon a comparison to a correlation threshold, the correlator selectively holds the correlation options constant to inhibit a new correlation, and/or selectively freezes streaming samples input to the computation logic via a plurality of corresponding shadow registers to save power.

20 Claims, 2 Drawing Sheets

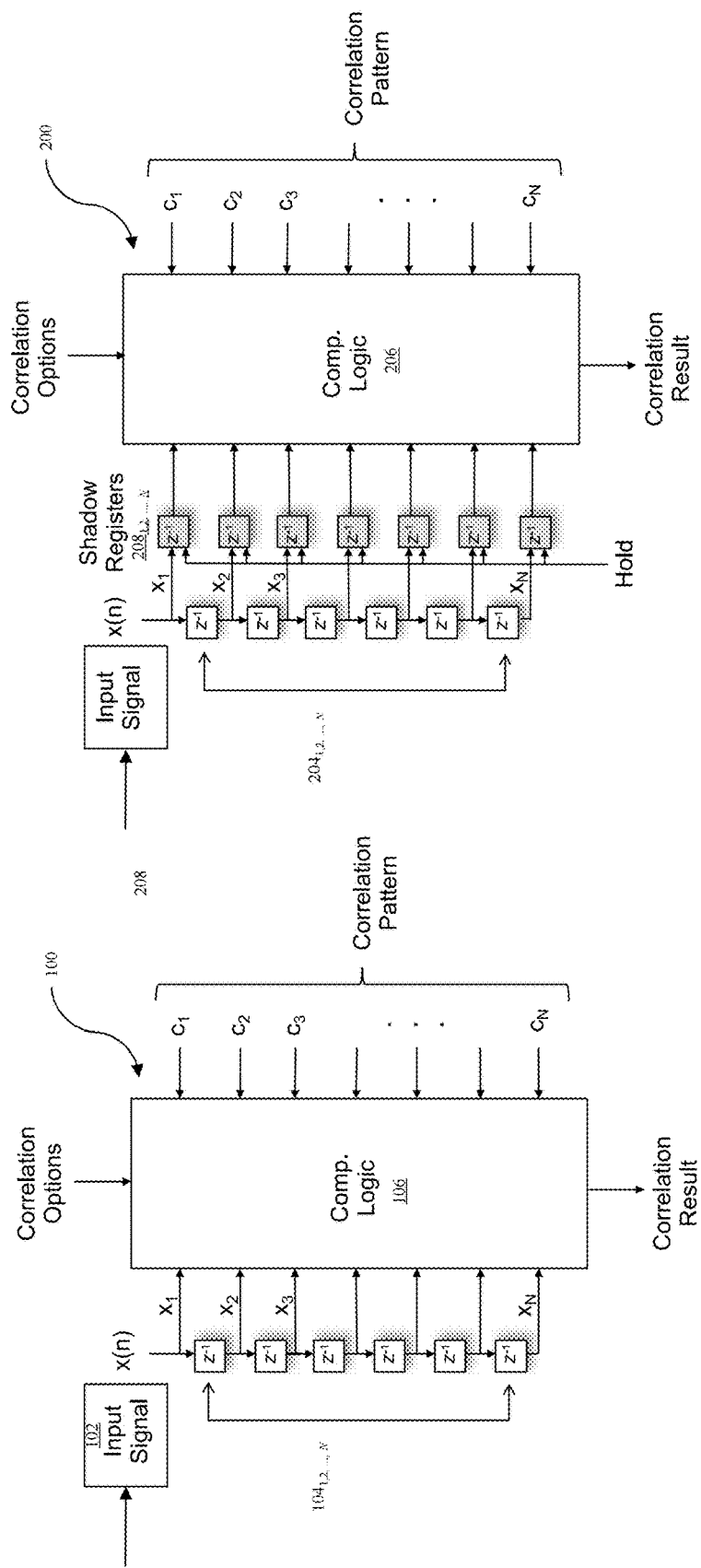

REDUCED-POWER DETECTION OF WIRELESS PACKETS USING DECIMATED PREAMBLE CORRELATION

The present invention relates generally to wireless communications, and more particularly, to a method, system and computer program product for reduced-power correlation for a preamble or other start-of-packet field in packet-based communication systems.

BACKGROUND

Prior to joining a communications network, a wireless device may disadvantageously spend a high percentage of time listening for packets or beacon signals from other devices. Typically, this process involves processing the received signal through a correlation detector that is matched to a preamble or other known start-of-packet delimiter. For example, in accordance with the IEEE 802.15.4 WPAN standard, each packet begins with a preamble comprised of 8 repetitions of a 32-chip pseudo-random sequence. The receiver correlates for this sequence, and then decides whether a valid packet is present responsive to observing multiple correlation peaks. For optimum performance, correlation is performed on multiple frequency offsets in parallel, and the overall power consumption of the correlator represents a significant fraction (10%) of the total receive power. When the preamble is received, the main lobe of the correlation peak is 2-3 samples wide, and it is very unlikely that the strongest correlation peak will be preceded by a very weak correlation value.

Thus, there exists a need for a novel and efficient methodology that advantageously saves power by using a present correlation value to estimate the likelihood that the next correlation value will be a peak. If the likelihood is determined to be low, then the next correlation is skipped, thereby saving power.

BRIEF DESCRIPTION OF THE DRAWINGS

The present disclosure is illustrated by way of example and not limited in the accompanying figures in which like reference numerals indicate similar elements and in which:

FIG. 1 is a schematic diagram of a correlator for performing decimated preamble correlation;

FIG. 2 is a schematic of a correlator in accordance with an embodiment of the present disclosure.

DETAILED DESCRIPTION

Figure 3:
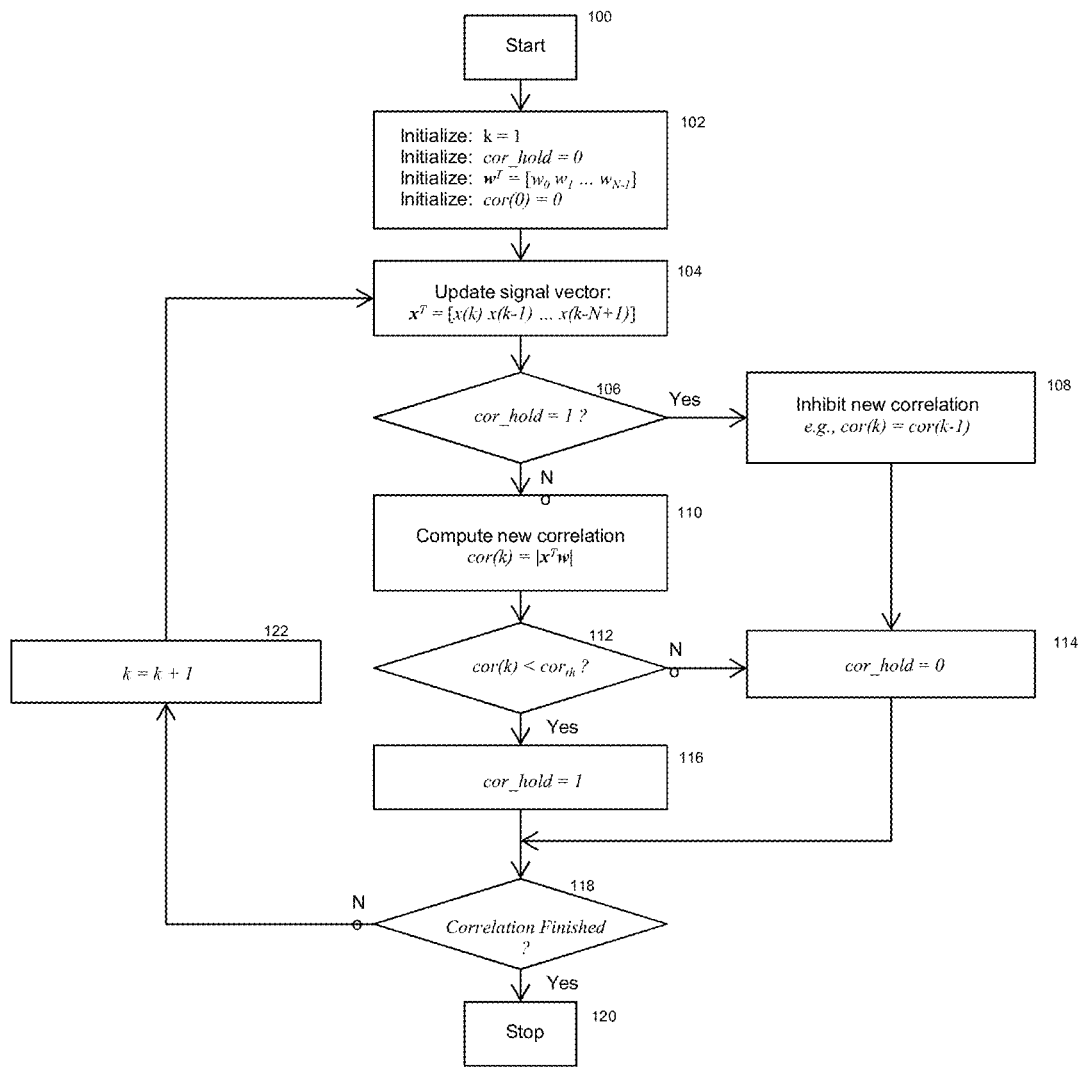
FIG. 3 is a flow diagram of a method for performing decimated preamble correlation in accordance with an embodiment of the present disclosure.

Specific embodiments of the disclosure will now be described in detail regarding the accompanying figures. For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

In the following detailed description of embodiments of the disclosure, numerous specific details are set forth in order to provide a more thorough understanding of the disclosure. However, it will be apparent to those skilled in the art that the disclosure may be practiced without these specific details. In other instances, well-known features have not been described in detail to avoid unnecessarily complicating the description.

It is to be understood that the terminology used herein is for the purposes of describing various embodiments in accordance with the present disclosure, and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period.

As used herein, the terms "about" or "approximately" apply to all numeric values, irrespective of whether these are explicitly indicated. Such terms generally refer to a range of numbers that one of skill in the art would consider equivalent to the recited values (i.e., having the same function or result). These terms may include numbers that are rounded to the nearest significant figure. In this document, any references to the term "longitudinal" should be understood to mean in a direction corresponding to an elongated direction of a personal computing device from one terminating end to an opposing terminating end.

In accordance with an embodiment of the present disclosure, there is provided a method of performing decimated preamble, midamble, and/or postamble correlation in wireless communications network. The method includes receiving, at a correlator, an input signal comprising a plurality of streaming samples of the input signal. The correlator applies the streaming samples of the input signal to a plurality of shift registers coupled to computation logic, where the computation logic receives an input of correlation options and a correlation pattern. The correlator is configured to selectively hold the correlation options constant to inhibit a new correlation and/or selectively freeze streaming samples input to the computation logic via a plurality of corresponding shadow registers based on a comparison of correlation results to a threshold. In accordance with another embodiment, a hold signal may be received at corresponding shadow registers to hold correlation options at a previous value.

In accordance with another embodiment of the present disclosure, there is provided a method of decimated correlation in wireless communications network, including: executing, by at least one processor, computer usable program code to cause a correlator to: receive an input signal comprising a plurality of streaming samples of the input signal; apply streaming samples of the input signal to computation logic, where the computation logic is configured to receive an input of correlation options and a correlation pattern; and selectively hold the correlation options constant to inhibit a new correlation and/or selectively freeze streaming samples input to the computation logic via a plurality of corresponding shadow registers based on a comparison of correlation results to a threshold.

In accordance with yet another embodiment of the present disclosure, there is provided an apparatus for performing decimated correlation in wireless communications network. The apparatus includes a receiver for receiving an input signal comprising a plurality of streaming samples of the input signal and a plurality of shift registers coupled to computation logic. The plurality of shift registers applies the streaming samples of the input signal to the computation logic, where the correlation logic is configured to receive an input of correlation options and a correlation pattern. The apparatus further includes logic for selectively holding the correlation options constant to inhibit a new correlation and/or selectively freeze streaming samples input to the computation logic via a plurality of corresponding shadow registers based on a comparison of correlation results to a threshold.

In accordance with still another embodiment of the present disclosure, there is provided a computer program product having computer usable program code stored on a non-transitory memory medium, which when executed by at least one processor, causes a correlator to perform decimated correlation in wireless communications network. The computer program product includes computer usable program code, which when executed by the at least one processor, causes a correlator to: receive an input signal comprising a plurality of streaming samples of the input signal; apply streaming samples of the input signal to computation logic, where the computation logic receives an input of correlation options and a correlation pattern; and selectively hold the correlation options constant to inhibit a new correlation and/or selectively freeze streaming samples input to the computation logic via a plurality of corresponding shadow registers based on a comparison of correlation results to a threshold.

In accordance with the above embodiments, the present correlation value can be used to estimate the likelihood that the next correlation value will be a peak. If the likelihood is determined to be low, then the next correlation is skipped, thereby saving power. The likelihood estimate can be accomplished using a fixed threshold or a variable threshold based on an average of previous correlation values. When the current correlation value is below the threshold, the likelihood is determined to be low that the next correlation value will be a peak. A threshold adjustment factor can be configured by software to make more conservative or aggressive estimates of the likelihood. This allows a software-controlled tradeoff between detection performance for power consumption.

This expedient can reduce the correlation duty cycle by up to 50%, depending upon the threshold setting. Compared to simply skipping every other correlation value, the threshold approach in accordance with embodiments of the present disclosure is more likely to find the strongest correlation peak.

With reference now to FIG. 1, there is depicted a schematic diagram of a correlator 100 for performing decimated preamble correlation. Correlator 100 includes or is coupled to a receiver 102 for receiving an input signal $I_s$ comprising a plurality of streaming samples $x=[x_1, x_2, \ldots, x_N]$ of the input signal. Correlator 100 includes shift registers $104_1$, $104_2, \ldots, 104_N$, to which are input the streaming samples of the input signal, and a block of computation logic 106 that computes the correlation of the shift register samples $x=[x_1, x_2, \ldots, x_N]$ and a known correlation pattern $c=[c_1, c_2, \ldots, c_N]$. The computation logic 106 is configured to change levels, and therefore consume switching power, whenever the input samples or correlation pattern change. There may also be correlation options, such as for example, selecting a frequency offset adjustment to the input signal. Any change in these options will also cause the computation logic 106 to change logic levels and consume switching power. To inhibit a new correlation such that power consumption is reduced, it is desirable to keep the inputs to the computation logic 106 from changing. The correlation pattern is generally held constant when searching for preamble or other start-of-packet field, but the input signal and correlation options change as each new sample enters the input shift register. In accordance with an embodiment of the present disclosure, the logic 106 is configured to selectively hold the correlation options constant to inhibit for a new input sample to inhibit a new correlation based on a comparison of correlation results to a threshold. This expedient can provide a partial power savings. The logic 106 may be implemented in hardware, firmware and/or software executing on at least one processor as will be appreciated by those skilled in the art.

Referring now to FIG. 2, there is depicted a schematic of a correlator 200 in accordance with another embodiment of the present disclosure. Correlator 200 includes or is coupled to a receiver 202 for receiving an input signal $I_s$ comprising a plurality of streaming samples $x=[x_1, x_2, \ldots, x_N]$ of the input signal. Correlator 200 includes shift registers $204_1$, $204_2, \ldots, 204_N$, to which are input the streaming samples of the input signal, and a block of computation logic 206 that computes the correlation of the shift register samples $x=[x_1, x_2, \ldots, x_N]$ and a known correlation pattern $c=[c_1, c_2, \ldots, c_N]$. Correlator 200 further includes a plurality of shadow registers $208_1, 208_2, \ldots, 208_N$, which are coupled to logic for selectively freezing the streaming samples input to the computation logic 206. In this regard, a hold signal is input to corresponding shadow registers to hold correlation options at a previous value based upon comparison to a correlation threshold. This permits the flow of input samples through the shift registers to remain uninterrupted, while providing the ability to freeze the samples presented to the computation logic 206. When the next correlation value is to be inhibited, the hold signal is asserted so that the shadow registers $208_1, 208_2, \ldots, 208_N$ are not updated, and correlation options are held at their previous value. This maintains the previous state of the computation logic so that no switching power is consumed.

Referring now to FIG. 3, there is depicted a flow diagram of a method for performing decimated preamble correlation in accordance with an embodiment of the present disclosure. The process begins at block 300, and proceeds to block 302, where the following are initialized:

Initialize: k=1
Initialize: cor_hold=0
Initialize: $w^T=[w_0\ w_1\ \ldots\ w_{N-1}]$
Initialize: cor(0)=0

At block 304, the signal vector is updated: $x^T=[x(k)\ x(k-1)\ \ldots\ x(k-N+1)]$.

Next, at block 306, if the correlation_hold=1, a defined threshold, then the method proceeds to block 308, where a new correlation is inhibited: cor(k)=cor(k-1).

Otherwise, at block 310 the correlation logic computes a new correlation:

$$cor(k) = |x^T w|$$

At block 312, if cor(k)<cor$_{th}$? then proceed to block 314 and set:
cor_hold=0
Otherwise, at block 316, set cor_hold=1
At block 318, if the correlation is finished, the process terminates at block 320.
Otherwise, proceed to block 322 and increment k=k+1, and update the signal vector in block 304.

The terms "program," "software application," and the like, as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

The present disclosure may be embodied within a system, a method, a computer program product or any combination thereof. The computer program product may include a computer readable storage medium or media having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Reference in the specification to "one embodiment" or "an embodiment" means that a particular feature, structure, or characteristic described in connection with the embodiment is included in at least one embodiment of the system. The appearances of the phrase "in one embodiment" in various places in the specification are not necessarily all referring to the same embodiment.

Embodiments of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

Some portions of the detailed descriptions, like the processes may be presented in terms of algorithms and symbolic representations of operations on data bits within a computer memory. An algorithm may be generally conceived to be steps leading to a desired result. The steps are those requiring physical transformations or manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The operations described herein can be performed by an apparatus. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk, read-only memories (ROMs), random access memories (RAMs), EPROMs, EEPROMs, magnetic or optical cards, or any type of media suitable for storing electronic instructions. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on one computer, partly on the computer, as a stand-alone software package, partly on the first computer and partly on a remote computer or entirely on the remote computer or server. In the latter scenario, the remote computer may be connected to the first computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry to perform embodiments of the present disclosure.

Accordingly, embodiments and features of the present disclosure are set out in the following in the following numbered items:

1. A method of decimated correlation in a wireless communications network, comprising: receiving, at a correlator, an input signal comprising a plurality of streaming samples of the input signal; applying the streaming samples of the input signal to a plurality of shift registers coupled to computation logic, the computation logic receiving an input of correlation options and a correlation pattern; and selectively holding the correlation options constant to inhibit a new correlation based on a comparison of correlation results to a threshold.

2. The method according to item 1, further comprising selectively freezing streaming samples input to the computation logic via a plurality of corresponding shadow registers.

3. The method according to item 2, further comprising receiving a hold signal at corresponding shadow registers to hold correlation options at a previous value.

4. The method according to item 2, further comprising: Initializing: k=1, Initializing: cor_hold=0, Initializing: $w^T$=[$w_0$ $w_1$ ... $w_{N-1}$], Initializing: cor(0)=0; and, updating a signal vector $x^T$=[x(k) x(k-1) ... x(k-N+1)] for each correlation.

5. The method according to item 4, further comprising: for cor_hold=1, Inhibit a new correlation: cor(k)=cor(k-1) and setting cor_hold=0 and ending the correlation; otherwise, computing a new correlation: cor(k)=|$x^T$w|.

6. The method according to item 5, further comprising incrementing k and updating the signal vector.

7. A method of decimated correlation in wireless communications network, comprising: receiving, at a correlator, an input signal comprising streaming samples of the input signal; applying a streaming sample of the input signal to computation logic, the computation logic receiving an input of correlation options and a correlation pattern; and selectively holding the correlation options constant to inhibit a new correlation based on a comparison of correlation results to a threshold.

8. The method according to item 7, further comprising applying streaming samples of the input signal to the computation logic.

9. The method according to item 7, further comprising selectively freezing streaming samples input to the computation logic via a plurality of corresponding shadow registers.

10. The method according to item 9, further comprising receiving a hold signal at corresponding shadow registers to hold correlation options at a previous value.

11. The method according to item 9, further comprising: Initializing: k=1, Initializing: cor_hold=0, Initializing: $w^T$=[$w_0$ $w_1$ ... $w_{N-1}$], Initializing: cor(0)=0; and, updating a signal vector $x^T$=[x(k) x(k-1) ... x(k-N+1)] for each correlation.

12. The method according to item 11, further comprising: for cor_hold=1, Inhibit a new correlation: cor(k)=cor(k-1) and setting cor_hold=0 and ending the correlation; otherwise, computing a new correlation: cor(k)=|$x^T$w|.

13. The method according to item 12, further comprising incrementing k and updating the signal vector.

14. An apparatus for performing decimated correlation in a wireless communications network, comprising: a receiver operable to receive an input signal comprising a plurality of streaming samples of the input signal; a plurality of shift registers coupled to computation logic, the plurality of shift registers configured to apply a streaming sample of the input signal to the computation logic, the correlation logic configured to receive an input of correlation options and a correlation pattern; and logic that selectively holds the correlation options constant to inhibit a new correlation based on a comparison of correlation results to a threshold.

15. The apparatus according to claim 14, further comprising applying streaming samples of the input signal to the computation logic.

16. The apparatus according to item 14, further comprising logic that selectively receives streaming samples input to the computation logic via a plurality of corresponding shadow registers.

17. The apparatus according to item 16, where the plurality of corresponding shadow registers receive a hold signal and hold correlation options at a previous value in response thereto.

18. The apparatus according to item 15, the logic further operable to: Initialize: k=1, Initialize: cor_hold=0, Initialize: $w^T$=[$w_0$ $w_1$ ... $w_{N-1}$], Initialize: cor(0)=0; and, update a signal vector $x^T$=[x(k) x(k-1) ... x(k-N+1)] for each correlation.

19. The apparatus according to item 17, where the logic is further operable to: for cor_hold=1, Inhibiting a new correlation: cor(k)=cor(k-1) and setting cor_hold=0 and ending the correlation; otherwise, computing a new correlation: cor(k)=|$x^T$w|.

20. The apparatus according to item 18, the logic further operable to increment k and updating the signal vector.

21. A computer program product comprising computer usable program code stored on a non-transitory memory medium, which when executed by at least one processor, causes a correlator to perform decimated correlation in a wireless communications network, comprising: computer usable program code, which when executed by the at least one processor, cause a correlator to: receive an input signal comprising a streaming sample of the input signal; apply the streaming sample of the input signal to computation logic, the computation logic receiving an input of correlation options and a correlation pattern; and selectively hold the correlation options constant to inhibit a new correlation based on a comparison of correlation results to a threshold.

22. The computer program product according to item 21, further comprising computer usable program code for selectively freezing streaming samples input to the computation logic via a plurality of corresponding shadow registers.

23. A method of performing decimated correlation in a wireless communications network, comprising: receiving an input signal comprising a plurality of streaming samples of the input signal; applying the streaming samples of the input signal to computation logic, receiving an input of correlation options and a correlation pattern at the computation logic; and selectively holding the correlation options constant to inhibit a new correlation based on a comparison of correlation results to a threshold.

24. The method according to item 23, further comprising selectively freezing streaming samples input to the computation logic.

25. The method according to item 24, further comprising: Initializing: k=1, Initializing: cor_hold=0, Initializing: $w^T$=

$[w_0 \ w_1 \ \ldots \ w_{N-1}]$, Initializing: cor(0)=0; and, updating a signal vector $x^T=[x(k) \ x(k-1) \ \ldots \ x(k-N+1)]$ for each correlation.

26. The method according to item 25, further comprising: for cor_hold=1, Inhibiting a new correlation: cor(k)=cor(k−1) and setting cor_hold=0 and ending the correlation; otherwise, computing a new correlation: cor(k)=|x$^T$w|.

27. The method according to item 26, further comprising incrementing k and updating the signal vector.

In accordance with the foregoing, a novel method, system and wall/floor covering for indicating structural damage to underlying dwelling structure has been disclosed. Having thus described the invention of the present application in detail and by reference to embodiments thereof, it will be apparent that modifications and variations are possible without departing from the scope of the invention defined in the appended claims as follows:

We claim:

1. A method of performing decimated correlation in a wireless communications network, comprising:
    receiving, at a correlator, an input signal comprising a plurality of streaming samples of the input signal;
    applying the streaming samples of the input signal to N shift registers coupled to computation logic, the computation logic receiving an input of correlation options related to the input signal and a known correlation pattern $[c_1, c_2, \ldots c_N]$ to generate a correlation based on the input of correlation options and the known correlation pattern $[c_1, c_2, \ldots c_N]$;
    selectively holding the correlation options constant at a plurality of corresponding shadow registers to inhibit a new correlation based on a comparison of correlation results to a threshold;
    computing a new correlation |x$^T$w| using a correlation value w over a sampling period T; and
    updating a signal vector $x^T=[x(k) \ x(k-1) \ \ldots \ x(k-N+1)]$ for the plurality of streaming samples $[x_1, x_2, \ldots x_N]$ of the input signal for each correlation.

2. The method according to claim 1, further comprising selectively freezing streaming samples input to the computation logic via the plurality of corresponding shadow registers.

3. The method according to claim 2, further comprising receiving a hold signal at corresponding shadow registers to hold correlation options at a previous value.

4. The method according to claim 1, further comprising:
    Initializing k: k=1
    Initializing a correlation hold value: cor_hold=0
    Initializing the correlation value w over the sampling period T: $w^T=[w_0 \ w_1 \ \ldots \ w_{N-1}]$; and
    Initializing a correlation: cor(0)=0.

5. The method according to claim 4, further comprising:
    for cor_hold=1, Inhibit a new correlation: cor(k)=cor(k−1) and setting cor_hold=0 and ending the correlation; otherwise, computing a new correlation: cor(k)=|x$^T$w|.

6. The method according to claim 5, further comprising incrementing k and updating the signal vector.

7. A method of decimated correlation in wireless communications network, comprising:
    receiving, at a correlator, an input signal comprising a plurality of streaming samples of the input signal;
    applying a streaming sample of the input signal to computation logic, the computation logic receiving an input of correlation options related to the input signal and a known correlation pattern $[c_1, c_2, \ldots c_N]$ to generate a correlation based on the input of correlation options and the known correlation pattern $[c_1, c_2, \ldots c_N]$; and
    selectively holding the correlation options constant at a plurality of shadow registers to inhibit a new correlation based on a comparison of correlation results to a threshold;
    computing a new correlation |x$^T$w| using a correlation value w over a sampling period T; and
    updating a signal vector $x^T=[x(k) \ x(k-1) \ \ldots \ x(k-N+1)]$ for the plurality of streaming samples $[x_1, x_2, \ldots x_N]$ of the input signal for each correlation.

8. The method according to claim 7, further comprising applying streaming samples of the input signal to the computation logic.

9. The method according to claim 7, further comprising selectively freezing streaming samples input to the computation logic via the plurality of corresponding shadow registers.

10. The method according to claim 9, further comprising receiving a hold signal at corresponding shadow registers to hold correlation options at a previous value.

11. The method according to claim 9, further comprising:
    Initializing k: k=1
    Initializing a correlation hold value: cor_hold=0
    Initializing the correlation value w over the sampling period T: $w^T=[w_0 \ w_1 \ \ldots \ w_{N-1}]$; and
    Initializing a correlation: cor(0)=0.

12. The method according to claim 11, further comprising:
    for cor_hold=1, Inhibit a new correlation: cor(k)=cor(k−1) and setting cor_hold=0 and ending the correlation; otherwise, computing a new correlation: cor(k)=|xTw|.

13. The method according to claim 12, further comprising incrementing k and updating the signal vector.

14. An apparatus for performing decimated correlation in a wireless communications network, comprising:
    a receiver operable to receive an input signal comprising a streaming sample of the input signal;
    a plurality of shift registers coupled to computation logic, the plurality of shift registers configured to apply the streaming sample of the input signal to the computation logic, the computation logic configured to receive an input of correlation options related to the input signal and a known correlation pattern $[c_1, c_2, \ldots c_N]$ to generate a correlation based on the input of correlation options and the known correlation pattern $[c_1, c_2, \ldots c_N]$; and
    logic that:
        selectively holds the correlation options constant at a plurality of shadow registers to inhibit a new correlation based on a comparison of correlation results to a threshold;
        computes a new correlation |x$^T$w| using a correlation value w over a sampling period T; and
        updates a signal vector $x^T=[x(k) \ x(k-1) \ \ldots \ x(k-N+1)]$ for the plurality of streaming samples $[x_1, x_2, \ldots x_N]$ of the input signal for each correlation.

15. The apparatus according to claim 14, further comprising applying streaming samples of the input signal to the computation logic.

16. The apparatus according to claim 14, further comprising logic that selectively freezes streaming samples input to the computation logic via the plurality of corresponding shadow registers.

17. The apparatus according to claim 16, where the plurality of corresponding shadow registers receive a hold signal and hold correlation options at a previous value in response thereto.

18. The apparatus according to claim 15, the logic further operable to:
   Initialize k: k=1
   Initialize a correlation hold value: cor_hold=0
   Initialize the correlation value w over the sampling period T: $w^T=[w_0\ w_1\ \ldots\ w_{N-1}]$; and
   Initialize a correlation: cor(0)=0.

19. The apparatus according to claim 18, where the logic is further operable to:
   for cor_hold=1, Inhibit a new correlation: cor(k)=cor(k−1) and set cor_hold=0 and end the correlation;
   otherwise, compute a new correlation: cor(k)=|xTw|.

20. The apparatus according to claim 19, the logic further operable to increment k and update the signal vector.

* * * * *